US011948760B2

(12) United States Patent
Chapel et al.

(10) Patent No.: US 11,948,760 B2
(45) Date of Patent: Apr. 2, 2024

(54) HYBRID RELAY

(71) Applicant: Zonit Structured Solutions, LLC, Boulder, CO (US)

(72) Inventors: Steve Chapel, Iliff, CO (US); William Pachoud, Boulder, CO (US)

(73) Assignee: Zonit Structured Solutions, LLC, Boulder, CO (US)

( * ) Notice: Subject to any disclaimer, the term of this patent is extended or adjusted under 35 U.S.C. 154(b) by 0 days.

(21) Appl. No.: 18/133,382

(22) Filed: Apr. 11, 2023

(65) Prior Publication Data

US 2023/0245844 A1 Aug. 3, 2023

Related U.S. Application Data

(63) Continuation of application No. 17/201,960, filed on Mar. 15, 2021, now Pat. No. 11,626,262, which is a continuation of application No. 16/055,338, filed on Aug. 6, 2018, now Pat. No. 10,950,399, which is a continuation of application No. 15/425,831, filed on Feb. 6, 2017, now Pat. No. 10,068,730, which is a continuation of application No. 14/217,172, filed on Mar. 17, 2014, now Pat. No. 9,601,284.

(60) Provisional application No. 61/798,593, filed on Mar. 15, 2013.

(51) Int. Cl.
*H01H 29/00* (2006.01)
*H01H 9/56* (2006.01)
*H01H 57/00* (2006.01)

(52) U.S. Cl.
CPC ............ *H01H 29/004* (2013.01); *H01H 9/56* (2013.01); *H01H 57/00* (2013.01); *H01H 2029/008* (2013.01); *H01H 2057/006* (2013.01); *H01H 2201/022* (2013.01)

(58) Field of Classification Search
CPC ......... H01H 29/004; H01H 29/00; H01H 9/56
See application file for complete search history.

(56) References Cited

U.S. PATENT DOCUMENTS 1,773,036 A 8/1930 Fitz Gerald
2,979,578 A 4/1961 Curtis
3,161,745 A 12/1964 Anderson
3,331,937 A 7/1967 Harvey
4,156,216 A 5/1979 Bath
4,208,643 A * 6/1980 Snaper .................. H01H 29/00 335/49
4,628,161 A 12/1986 Thackrey
4,652,710 A 3/1987 Karnowsky et al.
4,742,263 A 5/1988 Harnden, Jr. et al.
5,581,192 A * 12/1996 Shea ..................... H01H 29/06 324/555
5,804,991 A 9/1998 Hu
(Continued)

*Primary Examiner* — Scott Bauer
(74) *Attorney, Agent, or Firm* — Davis Graham & Stubbs LLP

(57) ABSTRACT

A relay (1) includes a motor (20) and a primary electrical switch assembly (132). Primary electrical switching attachment points (113) are switched by a moveable switching link (101) which is moved in and out of the switch on an switched off position axially by the motor (20) in response to electrical signals delivered to the coil (26) via the flexible leads (32, 33). The switching link (101) includes a mercury reservoir (119). A piezoelectric disk bender (105) displaces mercury to close the gaps between the attachment points (113).

16 Claims, 13 Drawing Sheets

(56) References Cited

U.S. PATENT DOCUMENTS

| | | | | |
|---|---|---|---|---|
| 6,515,404 | B1 | 2/2003 | Wong | |
| 6,730,866 | B1 | 5/2004 | Wong et al. | |
| 6,879,088 | B2 * | 4/2005 | Wong | H01H 29/18 335/49 |
| 2004/0200705 | A1 * | 10/2004 | Wong | H01H 29/30 200/182 |
| 2004/0201309 | A1 | 10/2004 | Wong et al. | |
| 2004/0201330 | A1 | 10/2004 | Fong et al. | |
| 2006/0205950 | A1 | 9/2006 | Frigoli et al. | |
| 2008/0150659 | A1 * | 6/2008 | Yokoyama | H01H 29/00 335/49 |
| 2008/0223195 | A1 | 9/2008 | Shimizu | |
| 2012/0045976 | A1 | 3/2012 | Roser | |
| 2015/0055270 | A1 | 2/2015 | Chapel et al. | |
| 2016/0217949 | A1 * | 7/2016 | Rohner | H01M 6/38 |

* cited by examiner

Previous Art

Fig. 3

| Metal | Electrical Conductivity (10.E6 Siemens/m) | Electrical Resistivity (10.E-8 Ohm.m) | Thermal Conductivity (W/m.k) | Thermal Expansion coef. 10E-6(k-1) from 0 to 100°C | Density (g/cm3) | Melting Point (°C) |
|---|---|---|---|---|---|---|
| Silver | 62.1 | 1.6 | 420 | 19.1 | 10.5 | 961 |
| copper | 58.5 | 1.7 | 401 | 17 | 8.9 | 1083 |
| Gold | 44.2 | 2.3 | 317 | 14.1 | 19.4 | 1064 |
| Aluminium | 36.9 | 2.7 | 237 | 23.5 | 2.7 | 660 |
| Molybdenum | 18.7 | 5.34 | 138 | 4.8 | 10.2 | 2623 |
| Zinc | 16.6 | 6 | 116 | 31 | 7.1 | 419 |
| Lithium | 10.8 | 9.3 | 84.7 | 56 | 0.54 | 181 |
| Tungsten | 8.9 | 11.2 | 174 | 4.5 | 19.3 | 3422 |
| Brass | 15.9 | 6.3 | 150 | 20 | 8.5 | 900 |
| Carbon (ex PAN) | 5.9 | 16.9 | 129 | 0.2 | 1.8 | 2500 |
| Nickel | 14.3 | 7 | 91 | 13.3 | 8.8 | 1455 |
| Iron | 10.1 | 9.9 | 80 | 12.1 | 7.9 | 1528 |
| Palladium | 9.5 | 10.5 | 72 | 11 | 12 | 1555 |
| Platinium | 9.3 | 10.8 | 107 | 9 | 21.4 | 1772 |
| Tin | 8.7 | 11.5 | 67 | 23.5 | 7.3 | 232 |
| Chromium | 7.9 | 12.9 | 94 | 4.9 | 7.2 | 1907 |
| Tantalum | 7.7 | 13.1 | 58 | 6.3 | 16.7 | 3017 |
| Bronze 67Cu33Zn | 7.4 | 13.5 | 85 | 17 | 8.8 | 1040 |
| Carbon steel | 5.9 | 16.9 | 90 | 12 | 7.7 | 1400 |
| Lead | 4.7 | 21.3 | 35 | 29 | 11.3 | 327 |
| Titanium | 2.4 | 41.7 | 21 | 8.9 | 4.5 | 1668 |
| St.Steel316L EN1.4404 | 1.32 | 76 | 15 | 16.5 | 7.9 | 1535 |
| St.Steel 304 EN1.4301 | 1.37 | 73 | 16.3 | 16.5 | 7.9 | 1450 |
| Mercury | 1.1 | 90.9 | 8 | 61 | 13.5 | -39 |
| Fe. Cr. Alloy | 0.74 | 134 | 16 | 11.1 | 7.2 | 1440 |
| st.Steel 310 EN1.4841 | 1.28 | 78 | 14.2 | 17 | 7.75 | 2650 |

HYBRID RELAY

CROSS-REFERENCES

This application is a continuation of U.S. patent application Ser. No. 17/201,960, filed Mar. 15, 2021, entitled "HYBRID RELAY," which is a continuation of U.S. patent application Ser. No. 16/055,338, filed Aug. 6, 2018, entitled "HYBRID RELAY," now U.S. Pat. No. 10,950,399, issued Mar. 16, 2021, which is a continuation of U.S. patent application Ser. No. 15/425,831, filed Feb. 6, 2017, entitled "HYBRID RELAY," now U.S. Pat. No. 10,068,730, issued Sep. 4, 2018, which is a continuation of U.S. patent application Ser. No. 14/217,172, filed Mar. 17, 2014, entitled "HYBRID RELAY," now U.S. Pat. No. 9,601,284, issued Mar. 21, 2017, which claims priority to U.S. Provisional Application No. 61/798,593, entitled "HYBRID RELAY," filed Mar. 15, 2013. The contents of the above applications are incorporated herein by reference as set forth in full and priority therefrom is claimed to the full extent allowed by U.S. law.

The following applications are incorporated by reference herein, though no priority claim is made:

1) U.S. Provisional Patent Application No. 61/372,752, filed Feb. 26, 2013, entitled "HIGHLY PARALLEL REDUNDANT POWER DISTRIBUTION METHODS;"
2) U.S. Patent Application Publication No. US-2012/0181869-A1, published on Jul. 19, 2012, entitled, "PARALLEL REDUNDANT POWER DISTRIBUTION," U.S. patent application Ser. No. 13/208,333, ("the '333 Applications") filed on Aug. 11, 2011, entitled, "PARALLEL REDUNDANT POWER DISTRIBUTION," which is a nonprovisional of and claims priority from U.S. Provisional Patent Application No. 61/372,752, filed Aug. 11, 2010, entitled "HIGHLY PARALLEL REDUNDANT POWER DISTRIBUTION METHODS," and U.S. Provisional Patent Application No. 61/372,756, filed Aug. 11, 2010, entitled "REDUNDANT POWER DISTRIBUTION;"
3) U.S. Pat. No. 8,004,115 from U.S. patent application Ser. No. 12/569,733, filed Sep. 29, 2009, entitled AUTOMATIC TRANSFER SWITCH MODULE, which is a continuation-in-part of U.S. patent Ser. No. 12/531,212, filed on Sep. 14, 2009, entitled "AUTOMATIC TRANSFER SWITCH,", which is the U.S. National Stage of PCT Application US2008/57140, filed on Mar. 14, 2008, entitled "AUTOMATIC TRANSFER SWITCH MODULE," which claims priority from U.S. Provisional Application No. 60/894,842, filed on Mar. 14, 2007, entitled "AUTOMATIC TRANSFER SWITCH MODULE;"
4) U.S. Patent Application Publication No. US-2012-0092811 for U.S. patent application Ser. No. 13/108,824, filed on May 16, 2011, entitled, "POWER DISTRIBUTION SYSTEMS AND METHODOLOGY," is a continuation of U.S. patent application Ser. No. 12/891,500, filed on Sep. 27, 2010, entitled, "POWER DISTRIBUTION METHODOLOGY," which is a continuation-in-part of International Patent Application No. PCT/US2009/038427, filed on Mar. 26, 2009, entitled, "POWER DISTRIBUTION SYSTEMS AND METHODOLOGY," which claims priority from U.S. Provisional Application No. 61/039,716, filed on Mar. 26, 2008, entitled, "POWER DISTRIBUTION METHODOLOGY;" and, 5) U.S. Pat. No. 8,374,729, from U.S. patent application Ser. No. 12/569,377, entitled, "SMART ELECTRICAL OUTLETS AND ASSOCIATED NETWORKS," filed Sep. 29, 2009, which is a continuation of U.S. patent application Ser. No. 12/531,226, entitled, "SMART ELECTRICAL OUTLETS AND ASSOCIATED NETWORKS," filed on Feb. 16, 2010, which is the U.S. National Stage of PCT/US2008/057150, entitled, "SMART NEMA OUTLETS AND ASSOCIATED NETWORKS," filed on Mar. 14, 2008, which in turn claims priority to U.S. Provisional Application No. 60/894,846, entitled, "SMART NEMA OUTLETS AND ASSOCIATED NETWORKS," filed on Mar. 14, 2007.

FIELD

Embodiments of the present invention relate to the design and operation of a low loss mechanical relay with actuation speeds that are faster than traditional mechanical relay designs. There are many uses for such a device, we note uses of the present invention that relate generally to electrical power distribution and management and, in particular, to an electrical outlet, or other device associated with a local (e.g., single or multiple residential or business premises) circuit, to intelligently monitor at least a portion of the circuit and control delivery of electricity over the circuit. The invention also has application to the design and operation of power distribution devices, for example, manual or automatic transfer switches and, in particular, to devices used in mission critical environments such as medical contexts, the power utility grid or in data center or telecommunications environments.

BACKGROUND

Switching mechanisms for electrical connections currently are divided into solid-state based switching devices (triacs, etc.) that switch very fast but have the disadvantage of being inefficient, losing between 1-2% of the power sent through them as heat, and mechanical based relays that switch much slower but are much more efficient with minimal heat loss. Many devices use solid state switches or mechanical relays to control electricity with the advantages and drawbacks noted above. Regardless of the type of switch, solid-state or mechanical relay, in many applications, either or both transfer time and efficiency are important, and may be critical.

A key example is in intelligent power management of receptacles in the home and office, where "cycle-stealing" is used as described in "SMART ELECTRICAL OUTLETS AND ASSOCIATED NETWORKS", referenced above. Such cycle stealing relates to operation in a reduced power mode by eliminating half cycles (or integer multiples thereof) of the delivered power signal, preferably by switching synchronized with zero crossings of the power signal. This may be done, for example, to implement intelligent brown-outs in the case of power shortages. The relay needed for the application must be fast and efficient, because it must actuate quickly and also must function in an environment (for example inside a single-gang receptacle box) where cooling is limited.

Another example is the design and management of power distribution in data centers because the power supplies used in modern Electronic Data Processing (EDP) equipment can often only tolerate very brief power interruptions. For example, the Computer and Business Equipment Manufacturers Association (CBEMA) guidelines used in power supply design recommend a maximum outage of 20 milliseconds or less. This is a very important issue in the design of automatic transfer switches (ATS), for switching between two or more power sources (e.g., due to power failures such as outages or power quality issues), as well as other power distribution devices used with EPD equipment. There are many other examples of devices incorporating electricity, where the speed and/or efficiency of the switching function is an important issue and improvements in these areas would be of great benefit.

SUMMARY

The present invention relates to improving the transfer time of relays in various contexts including power distribution and management in the home and office and in data center environments. In particular, the invention relates to providing improved transfer time for very efficient relays which can be used in wide variety of applications where one or both of fast transfer time and efficiency are important. Such relays are useful in the design of automatic transfer switches (ATS), for switching between two or more power sources (e.g., due to power failures such as outages or power quality issues), as well as other power distribution components. Some of the objectives of the invention include the following:

- Providing methods to improve the transfer time of relays in connection with devices that use relays, for example automatic transfer switches, such that the transfer time of the device incorporating the improved relays is reduced;
- Improving the transfer time of a highly redundant, fault-tolerant, scalable, modular parallel switch design methodology that allows a family of automatic transfer switches in needed form factors to be constructed for a variety of auto-switching needs in the data center and other environments;
- These objectives and others are addressed in accordance with the present invention by providing various systems, components and processes for improving relay function. Many aspects of the invention, as discussed below, are applicable in a variety of contexts. However, the invention has particular advantages in connection with home and office power distribution, efficiency and management and in data center applications. In this regard, the invention provides considerable flexibility in maximizing power distribution efficiency and designing power distribution devices that use relays for use in data center and other environments. The invention is advantageous in designing the devices used in power distribution to server farms such as are used by companies such as Google or Amazon or cloud computing providers.

In accordance with one aspect of the present invention, a method and apparatus ("utility") is provided for switching power. The utility involves providing first and second electrical contacts and a drive system for driving at least one of the first and second contacts for relative movement therebetween. For example, the first electrode may be mounted on a piston that reciprocates within a cylinder and the second contact may be mounted on a wall of the cylinder. The first and second contacts are moveable between first and second positions where the contacts are separated by first distance in the first position and a second distance, less than the first distance, in the second position. The utility further involves an electrically conductive liquid system for establishing an electrical contact, via a conductive liquid, between the first and second contacts in the second position. For example, the electrically conductive liquid system may include a reservoir receptacle for retaining a supply of the conductive liquid and a pump mechanism for selectively pumping the conductive liquid into a space between the first and second contacts or retracting the conductive liquid from the space. In one implementation, the pump mechanism includes a piezo-electrical disk for contracting and expanding the reservoir receptacle. The present invention thereby provides a fast response like a solid-state based switching device while also providing excellent efficiency and minimum heat generation like a mechanical relay. Consequently, the invention can be used in a variety of contexts including synchronizing switching with zero crossings of the power signal, e.g., for cycle stealing.

BRIEF DESCRIPTION OF THE DRAWINGS

The present disclosure is described in conjunction with the appended figures:

FIG. 3 shows a table of materials properties directly relevant to the application of the invention.

Figure 1A:
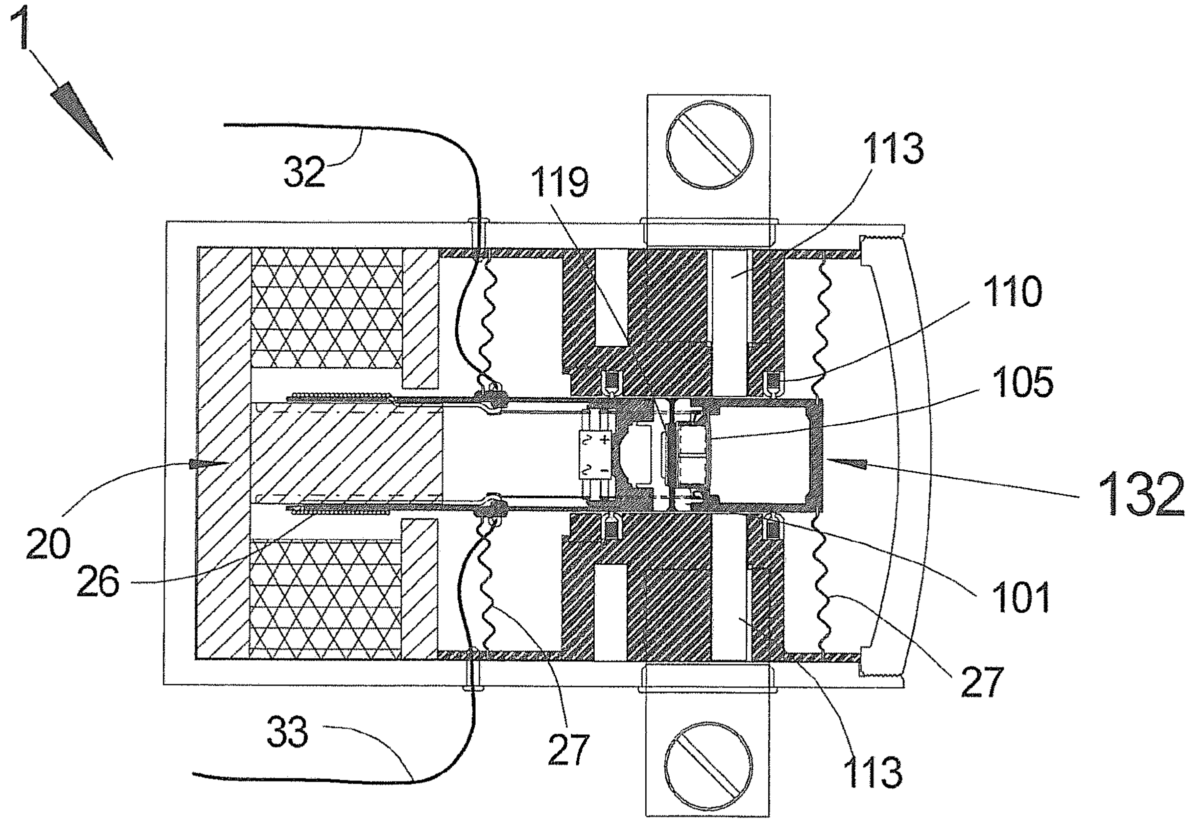
FIG. 1*a* shows an example of; a cross section along the major axis of a general example of the embodiment of the invention

In the appended figures, similar components and/or features may have the same reference label. Further, various components of the same type may be distinguished by following the reference label by a second label that distinguishes among the similar components. If only the first reference label is used in the specification, the description is applicable to any one of the similar components having the same first reference label irrespective of the second reference label.

DETAILED DESCRIPTION

This section describes a method to construct conductive liquid-wetted (mercury is used as the example liquid in the descriptions that follow, other conductive liquid materials or mixtures might be used to advantage) contact relay or switch assemblies. In the example relay the contacts are hermetically sealed in a chosen environment, for reasons that are detailed below. The simple example design facilitates manufacture by an assembly sequence that ensures precise control of mercury film maintenance and exact parts positioning, and can be readily automated even for subminiature sizes. The example relay disclosed in accordance with this invention has a relatively fast response time for the degree of current it is capable of switching. The example relay will switch on or off in a time period not to exceed one-half of an AC power cycle, or roughly 8 milliseconds in the U.S., where utility power is 60 Hz. This is a worst case scenario, in other conditions the transfer time of the example relay can be much less, which will be discussed below. In addition, because no parts are in significant frictional contact, nor is there any direct points of impact, the life expectancy (durability, MTBF) is very high. The design lends itself well to automated assembly processes, and utilizes existing mass production techniques well established for the electromotive portion of the assembly. This invention can be a direct competitor as a replacement to widely used Solid State Relays (SSR), with the major advantage of efficiency, it does not waste power in a semiconductor voltage drop. The example relay design shown has very high efficiency using innovative conductor to conductor contact methods with minimal voltage drop.

Design Considerations

Relays and switches of the mercury-wetted contact type have long been known for their good operating-cycle life and relative freedom from contact bounce. These and other advantages largely stem from the fact that the mercury contact film surface resists spark deterioration, improves dry-circuit (low current) circuit integrity, and provides mechanical damping that reduces bounce and chatter even with very small and low-inertia moving parts. Mercury, or liquid conduction, also allows for electrical contact to be made without solid part-to-part impacts. Having no moving electrical path parts that rub or strike against each other results in very long service life and very high cycle count durability. The principal disadvantages of such relays have been the necessity for compromises between providing an adequate mercury supply over long periods and the difficulties (bridging of insulating parts) if an excess of mercury is provided. A key issue is how to insure the mercury in the device stays where it is placed and used and remains functional for the service life of the device. This difficulty also tends to make the devices orientation sensitive. Also, the necessity for accurate gauging of the quantity of free mercury maintained in a reservoir or pool has made many designs unduly expensive, and inhibited automated assembly; moreover, in those designs which eliminate the mercury reservoir, and rely on capillary action for mercury film maintenance, gradual failure of the supply has tended to negate the long life expectancy predicted by theory. In addition, limitations in current handling characteristics due to the relatively poor conductivity of mercury has resulted in common variations of mercury wetted power relays becoming less desirable due to the relatively large volume of mercury required for significant current handling. Mercury, dispersed in the environment in significant quantities is toxic and is not sound environmental practice, as well as having a significant cost component.

For the purposes of the descriptions in this document, referring to FIG. 1, the primary electrical attachment points (113) and the link tips (101) are sometimes referred to as "contacts", and the space between them as the "contact gap". They do not physically touch and electrical conduction between them is only established by filling the gap between them with mercury or other suitable conductive liquid, in a controlled fashion as will be discussed below.

The invention can incorporate one or more of several innovative features:

The contact gap dimensions and volume are minimized to the space necessary to provide sufficient insulation when the relay is open (taking into account any residual wetting effects of the conductive liquid). This in turn helps to minimize the amount of conductive liquid necessary to fill the contact gap to close the relay.

The conductive liquid is held in reservoirs and used in contact geometries that help maximize the effect of the surface tension of the liquid to assist in efficiently moving the liquid into and out of the contact gap(s) and liquid reservoir(s). This also helps to insure that the relay can properly operate in many orientations.

The conductive liquid is used in contact geometries that help to maximize the efficiency of electrical current transmission through the electrical conduction path, thereby minimizing the amount of resistive loss due to the conductive liquid. This can be done by minimizing the contact gap dimensions as described above and designing the contact geometry appropriately. The example relay shown uses approximately 0.3 micro-liters of mercury per one ampere that flows through it, which is very little liquid for any mercury wetted device that is designed to carry one ampere or more; we know of no switching or relay devices rated for greater than one ampere that use one micro-liter of conductive liquid per ampere of rated capacity, other than specialized reed types. In the example relay whose description follows, the contact area is relatively large relative to the current flowing through it. This fact, combined with the minimized contact gap means that the conductive path through the liquid is short and can use a large area of the contacts. This minimizes resistive loss if the liquid is less conductive than the solid contact material. Other conductive liquids can have the contact geometry and gaps optimized to best use their specific properties.

The conductive liquid is moved into the contact gaps (and out of the reservoirs) using fast acting mechanical methods. In the example shown, a piezo-electric disk is shown as the motive device. Other methods could be used, for example a miniature solenoid activated plunger, etc.

The use of a conductive liquid means that there is no necessity for the solid contacts to touch each other in normal operation. This allows the design of a relay with a very long service life, due to almost no wear on the contacts. The other parts of the assembly that move can be built with appropriate construction and materials for the desired service life.

The relay assembly can be vacuum sealed at a low pressure (or potentially a specified gaseous mix used to advantage at a desired optimized pressure in a sealed relay assembly) to facilitate the control and retention of the conductive liquid and potentially improve the amperage and voltage capacity of the relay. In the example that follows, mercury is used and the relay is vacuum sealed and the functional benefits of this variant are described. Other variations, such as an overpressure sealed relay chambers using inert gases might also be advantageous. Depending on the conductive liquid chosen, their reservoirs could incorporate sealed gases that have beneficial effects on the long-term stability of the conductive liquid.

The contacts can be designed to move and their movement controlled so that the combination of moving the conductive liquid into (or out of) the contact gap and the movement of the contacts combine to advantage. This technique can help in insuring that the relay properly breaks and connects the electrical connectivity paths.

The contact materials and construction can be specifically chosen to best function with the chosen conductive liquid. This is described in the example relay described below and is an important feature of the design. Different contact materials and construction techniques can be chosen and optimized to work best together.

The ability to quickly move the conductive liquid allows very fast actuation times when used in a controlled application environment, (for example "cycle-stealing" as described in U.S. Pat. No. 8,374,729, issued on Feb. 12, 2013, entitled, SMART ELECTRICAL OUTLETS AND ASSOCIATED NETWORKS) where the time at which switching the relay on or off is known in relation to the state of the AC cycle and/or when "zero voltage crossings" will occur. The example relay will be able to actuate from on to off and off to on in approximately one half of a millisecond in such a scenario. When the state of the AC cycle is random in relation to the time when a command to switch the example relay is given, the actuation time of the example relay is similar to solid-state switches because the design shown would need to wait for the next available "zero voltage crossing" before actuating, which could be up to eight milliseconds. This constraint is the same for current solid state switches and the example relay. Other possible variants of the current invention may not share this limitation.

Example Relay Components

Figure 1B:
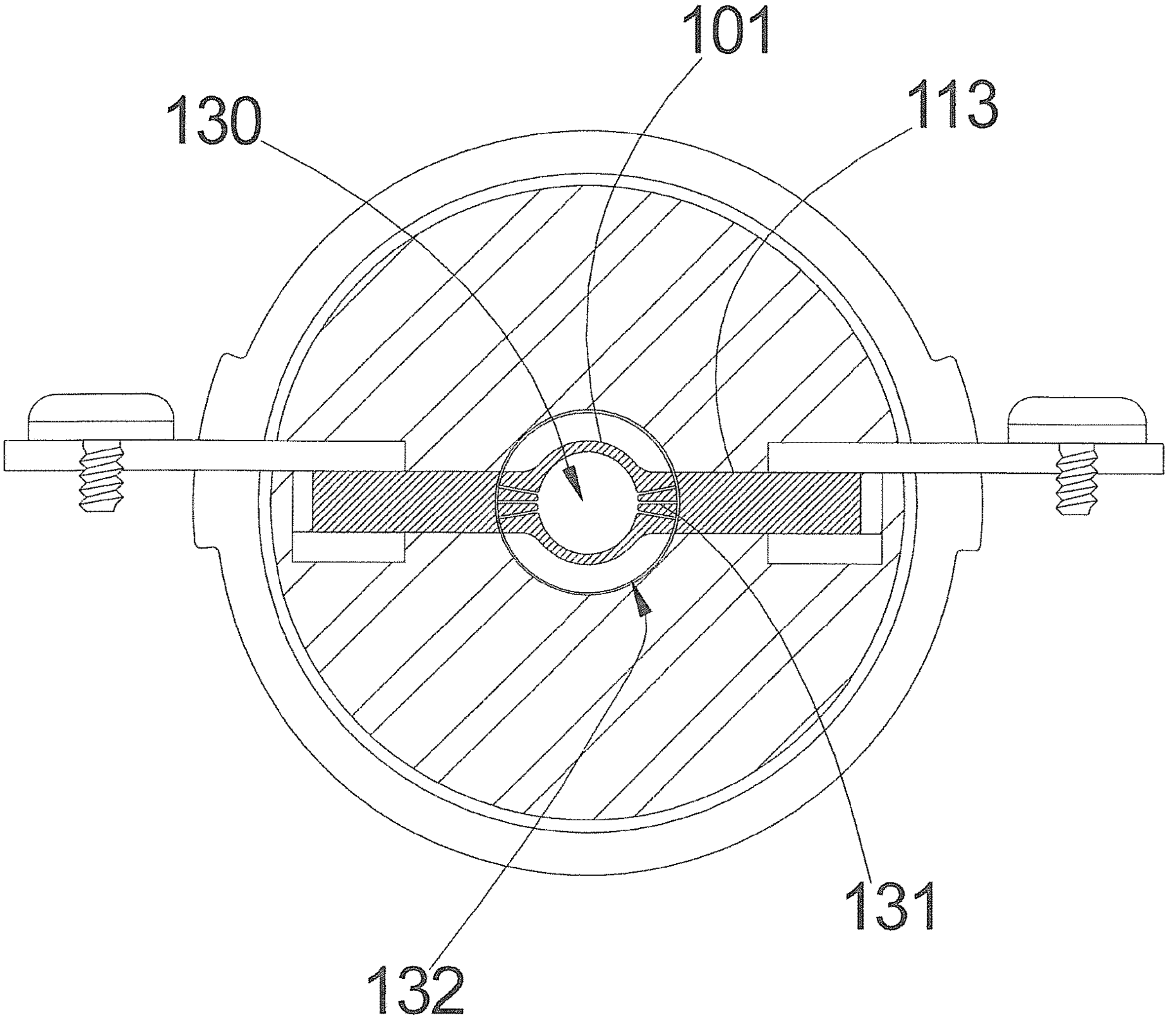
FIG. 1*b* shows an example of; a cross section through the radial axis of a general example of the embodiment of the invention.

Two primary components of the relay assembly (1) of this example are the electrical contact section, switch, and the electromotive actuator, or motor. FIG. 1*a* depicts a cross section of the invention through the longitudinal axis, and FIG. 1*b* is a cross section through the contact area in a radial fashion. The principal components of the relay assembly (1) are an electromotive source, or motor (20) and a primary electrical switch assembly (132). Primary electrical switching attachment points (113) are switched by a moveable switching link (101) which is moved in and out of the switched on and switched off position axially by the motor (20) in response to electrical signals delivered to the coil (26) via the flexible leads (32, 33). Centering of the piston assembly while allowing essentially free movement along the longitudinal axis is enabled by spiders (27). The switching link (101), heretofore called the link, has an internal chamber called the mercury reservoir (119). The mercury reservoir has portals from the volume space of that reservoir to the tips of the link (101). A piezoelectric disk bender (105) is attached to the front of the mercury reservoir (119) in such a manner as to allow displacement of a small amount of mercury (or other suitable electrically conductive liquid) by application of a small current to the piezoelectric element (105) That small amount of mercury will be inserted in the gap between the tips of the link and the primary electrical switching attachment points (113) to complete the electrical path while maintaining the gap, the tips of the link and the primary electrical switching attachment points never touch each other. In other words, when the motor axially positions the link (101) in between the primary electrical switching attachment points (113), the piezoelectric disk bender will relax and force flow of electrically conductive liquid, mercury in this example, into the gap formed between the link (101) tips and the primary electrical switching attachment points (113).

The function of the mercury reservoir is a fundamental concept of this invention. A combination of the piezoelectric element moving the mercury and mechanical motion from a different electromotive source is used to create a sufficient gap in the electrical switching members to insure non-conduction of even high AC voltages, such as US standard 120, 208, and 277 Volts AC, or European voltages of 220, 230 and 240 Volts AC, when the relay is open. The gap resulting in the non-contact of the link and the primary electrical switching attachment points is filled at the last possible moment by the electrically conductive mercury by the action of the piezoelectric element. In this manner, very fast initial connection and disconnection of the primary switch can be obtained by the movement of very small amounts of mercury, while the relatively large inertia of the piston is then moved such that the needed position between the primary electrical switching attachment points is obtained, they are either offset (open position) or aligned (closed position). This combination of very fast initial switching, followed by the slower action of moving the link physically to the open or closed position allows for higher voltage and currents to be switched effectively.

The instantiation of the invention described is intended for use with alternating current electrical sources. The action of the invention is dependent on the electrical voltage and current of the source passing through the zero point for the current every one-half cycle. At that moment, electronic drive circuits will have initiated the motion of the mercury in a manner such that the contact between the mercury and the primary electrical switching attachment points is either made, or disconnected. Thus, the mercury will be touching, or not touching the electrical switching attachment point concurrent to when there is no, or little current and voltage. This precise control of the mechanical connection time is made possible by the electronic drive timing circuit and the very low volume of mercury in the very small reservoir associated with filling or evacuating the gap between the link and the primary electrical switching attachment points.

A relay disconnect sequence will now be described. As the AC cycle proceeds past the zero crossing, the voltage increases and the movement of the piston proceeds, retreating the link in a disconnect sequence. This retreating is faster than the rate of rise of the AC voltage now forming across the gap between the link and the primary electrical switching attachment points. Meanwhile, the mercury has been fully retracted into the reservoir via the action of piezo disk bender until the piston comes to rest in the switch open position at the other end of the travel of the spiders.

FIG. 1*b* depicts a cross section radially through the link (1), piston assembly (132), and primary electrical switching attachment points (113) while the overall relay assembly is in the switched closed position. The electrically conductive material, mercury, is contained in a reservoir (13) and delivered to the gap between the link (101) and the primary electrical switching attachment points (113) via one or more ports (131).

Example Relay Operation

The first discussion will be of the motor, which is a linear actuation type most commonly found in audio applications. Loudspeakers, or speakers, are well known in the art and are commonly used in a variety of applications, such as in home theater stereo systems, car audio systems, indoor and outdoor concert halls, and miniaturized forms are widely found in headphones, cell phones and the like. A loudspeaker typically includes an acoustic transducer comprised of an electromechanical device which converts an electrical signal into acoustical energy in the form of sound waves and an enclosure for directing the sound waves produced upon application of the electrical control. For the purpose of this invention, little concern is attached to the action of the electromotive forces on air to produce sound. But the principals, construction considerations and high volume manufacturing processes used do apply to the electromotive portion of a loudspeaker in the sense that those components relate directly to the intended application.

Figure 2A:
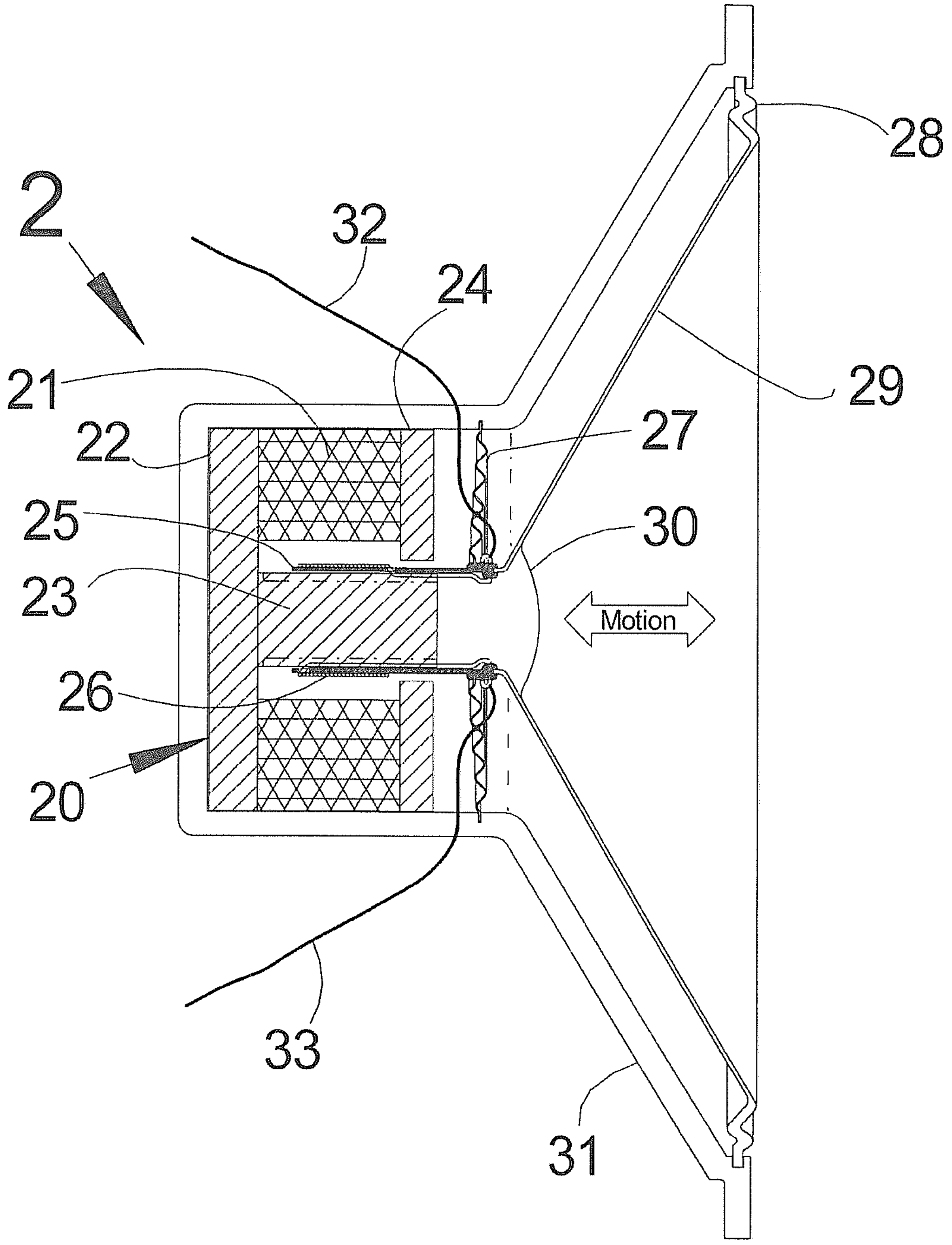
FIG. 2*a* shows an example of: prior art describing a generic loudspeaker containing electromotive drive components directly applicable to the example relay mechanism.

A loudspeaker, FIG. 2*a*, (2) comprises a coil of wire (26), typically referred to as a voice coil, which is suspended between a pole piece and a permanent magnet. In operation, an alternating current from an electronic current source (amplifier) flows through the voice coil, which produces a changing magnetic field around the voice coil. The changing magnetic field around the voice coil interacts with the magnetic field produced by the permanent magnet (21) to produce reciprocal forces on the voice coil representing the current in the voice coil.

The voice coil is disposed within the loudspeaker so that it can reciprocate in accordance with the forces imposed along the pole piece. The voice coil is attached to a cone shaped diaphragm (29) which vibrates in response to the reciprocal movement of the voice coil. The vibration of the diaphragm produces acoustic energy in the air, i.e., a sound wave. In the application of this invention, the movement of the voice coil is directly connected to the electrical switch, turning it on and off at a rate consistent with the electronic signal applied to the voice coil. For purpose of clarity, the voice coil will be henceforth referred to as the coil.

An example of components used in the construction of a conventional loudspeaker is shown in FIG. 2*a*. The loudspeaker (2) includes a speaker cone (29), a surround flex (28), a coil bobbin (25), and a dust cap (30). The diaphragm (29), the dust cap (30) and the coil bobbin (25) are attached to one another by, for example, an adhesive. Typically, the coil bobbin (25) is made of a high temperature resistant material such as glass fiber or aluminum around which an electrical winding or a coil (26) is attached such as by an adhesive. The coil (26) is connected to suitable leads (32, 33) to receive an electrical input signal from the electronic current source (henceforth referred to as the input signal).

The diaphragm (29) is provided with a surround flex (28) at its peripheral made of a flexible material such as a urethane foam, butyl rubber or the like. The diaphragm (29) is connected to the speaker frame (31) at the surround flex, (28) by means of, for example, an adhesive. At about the middle of the speaker frame (31), the intersection of the diaphragm (29) and the coil bobbin (25) is connected to the speaker frame (31) through a inner suspension, henceforth called a spider, (27) made of a flexible material such as cotton with phenolic resin, woven fiberglass or carbon filaments and the like. The periphery surround (28) and the spider (27) allow the flexible linear movements of the diaphragm (29) in a single axis, as well as limit or damp the amplitudes (movable distance in an axial direction) of the diaphragm (29) when it is moved in response to the electrical input signal.

The loudspeaker (2) also comprises a magnetic assembly (20) formed of an air gap between the front plate (24) and the core pole (23). The air gap has a strong magnetic flux across it induced from the magnet (21) through the back plate (22), the core (23) and the front plate (24). In this example, the core pole (23) has a back plate (22) bonded at its mating surfaces. The core pole (23) has grooves for the coil wire feeds to pass in.

The permanent magnet (21) is disposed between the front plate (24) and the back plate (22) of the core pole (23). The back plate (22), front plat (24) and the core pole (23) are constructed from a material capable of carrying magnetic flux, such as iron. Therefore, a magnetic path is created through the pole piece (23), the front plate (24), the permanent magnet (21) and the back plate (22) through which the magnetic flux is running. The air gap is created between the core pole (23) and the front plate (24) in which the coil (26) and the coil bobbin (25) are inserted in. Thus, when the electrical input signal is applied to the coil (26), the current flowing in the coil (26) and the magnetic flux, they interact with one another to produce electromotive force. This interaction produces a force on the coil (26) which is proportional to the product of the current and the flux density. This force results in the movement of the coil (26) and the coil bobbin (25), which moves the diaphragm (29), thereby producing the sound waves. In the application of this invention, the diaphragm is replaced by a tubular extension of the bobbin in which the primary electrical switch contact is housed. Hereafter, this extension and the bobbin will be referred to as the piston.

Figure 2B:
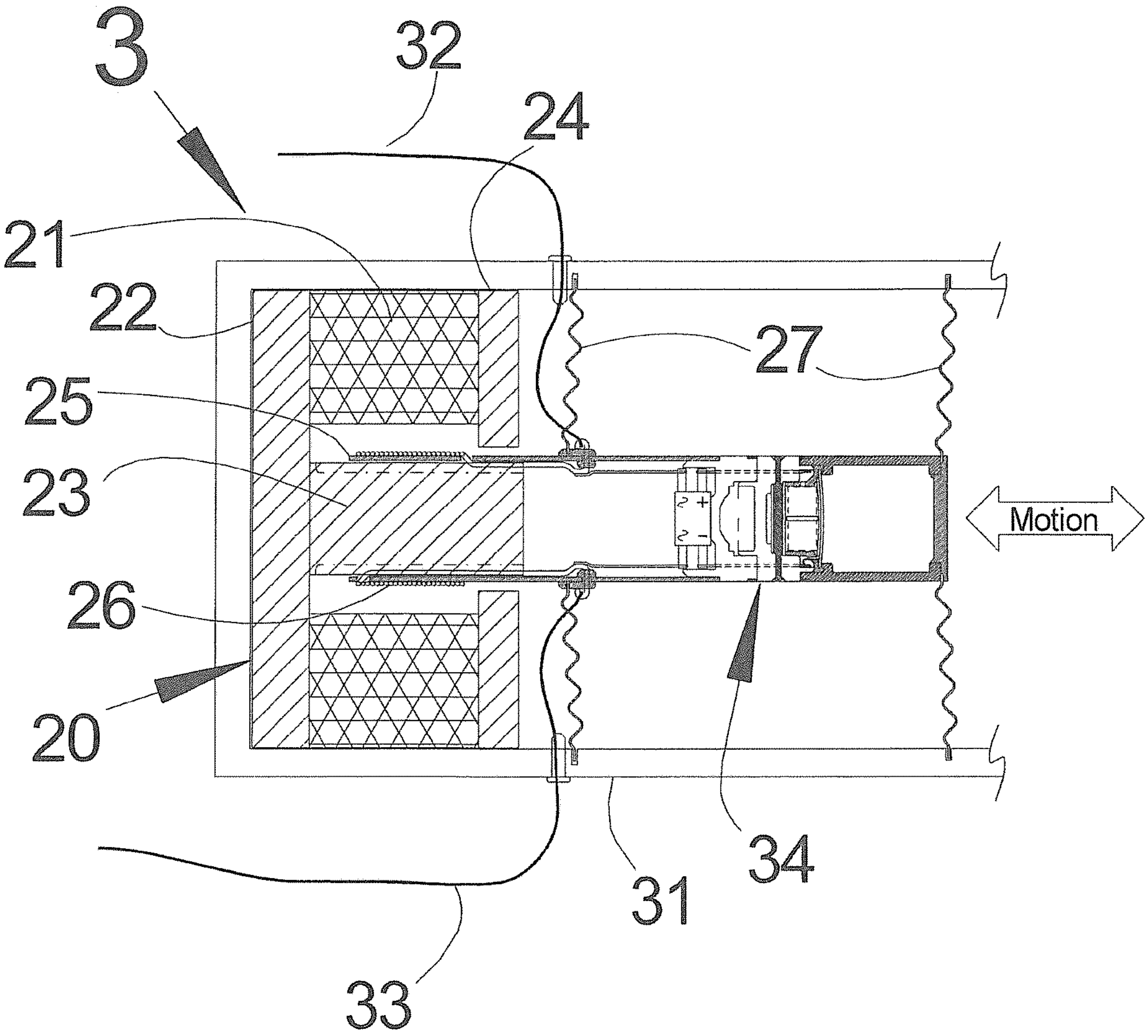
FIG. 2*b* shows an example of: the application of loudspeaker type electromotive drive components as applied to the example relay mechanism.

In FIG. 2*b* the basic components of the motor section of this invention are described. The description of the loudspeaker motor applies directly. In fact, the construction of the components are so similar that existing production means for mass production directly apply to this invention, hence, the detailed description of the "loudspeaker". In FIG. 2*b*, it should be noted that the motor is exactly the same as in the FIG. of 2*a*, the loudspeaker. The description of its operation is exactly the same and references previously made describing the motion are the same. The diaphragm of FIG. 2*a* is replaced with a piston assembly (34). Presuming the electromotive forces generated in the coil (26) are producing linear motion along the major axis of the assembly, it can be clearly observed that the piston assembly (34) will move similarly. An additional spider (27) is located at the front end of the piston assembly (34) and provides a second concentric support, flexible only in one axis now when connected to the spider at the back of the piston assembly (34).

The contact assembly, or piston, is essentially of concentric or cylindrical symmetry fabricated of circular or tubular subassemblies, machined tubular inserts and plastic, of various compositions, injection molded when applicable, placed together in a stack assembly process which inherently ensures precise positioning of the parts, including the contact spacing. In addition, the volume of the mercury reservoir chamber is precisely controlled. Special treatment of certain of the parts for control of mercury wettability permits exact gauging of the supply of mercury for permanent optimization of the mercury film without any pooling or excess. Use of commonly available ferro-fluid seals are also partly responsible for the containment of mercury and can increase the operating life of the example relay. Other forms of seals may be used (or added in addition, if this is found to be desirable for extended service life or other considerations) such as Viton™, at some potential performance degredation, due to increased friction and/or shorter service life, however this may be a worthwhile cost-benefit tradeoff. Provision of the desired gaseous atmosphere, preferably a noble gas, is facilitated in that conventional out-gassing and sealing off machinery can be utilized, as in miniature lamp manufacture. In brief, this preferred embodiment of the relay comprises a central moving contact element in the form of an electrically isolated piston with a mercury wetted pair of contacts. The contact piston is actuated by a electromotive linear motor very similar to what is commonly found in loudspeakers. In the description which follows, the term "wet by mercury" refers to a surface which is wettable by mercury, (or by any suitable electrically conductive liquid), and which is in fact wetted by a film of the mercury applied thereto. Wettability may be inherent in the material of which the surface is a boundary or may be imparted (or prevented) in other cases by appropriate surface treatment, plating or cladding, as described below. Non-wettability, heretofore called Hg-phobic, is also a critical consideration in this example. Materials such as Tantalum, Chromium and Tungsten are examples of Hg-phobic conductors. Materials such as Silver, Gold and Copper are Hg-wettable. The term "magnetic" applied to materials refers to those whose magnetic permeability is substantially greater, or many times greater, than that of air; for example, mild iron or steel. No permanent residual magnetization or high degree of remanence magnetization is intended to be implied by the unqualified term "magnetic."

FIG. 3 shows various metals and some of their electrical and physical properties. Selection of various metals for specific purposes in the example relay is dependent on the characteristics of each metal, and the application of various electrical and mechanical stresses on those materials. For example, the primary electrical switching attachment points and the link are principally made of either brass or copper due to their very low resistance, or inversely the very high electrical conductivity, as well as low cost and ease of manufacturing. The surfaces of electrical mating with the mercury, such as at the tips of the link, and the inside bore of the primary electrical switching attachment points are plated with a much higher melting point material such as Tungsten, Lithium, Chromium or Tantalum to reduce loss of material from electrical arcing at the moment of connect or disconnect. Even though the timing circuit, and design of the high speed mercury displacement, occurs at or near the zero crossing of voltage and current, it is impossible to time this perfectly. There will always be some level of voltage difference between the switching components. Thus, having higher melting points reduces the volume of material affected by that arcing. Selection of these materials is further defined by the wetting characteristics of the mercury to each. A plating of suitable Hg-phobic characteristics will result in reduced mercury retention on the mating surface when the mercury is retracted, thus leaving a greater gap between the link and the primary electrical switching attachment points. Materials such as Tantalum and Tungsten are good, but have difficulty in either availability or application. Chromium is also a good Hg-phobic material, but has lower electrical conductivity. Selection of the proper plating will ultimately be defined by the expected current, voltage and durability of the relay with respect to cost of manufacturing. The initial construction of the example relay utilizes Chromium due to the ease of application, low cost and relative durability. Improved performance or form factors may be realized by application of Tantalum or Tungsten.

The design of the outer shell of the example relay includes hermetic sealing. This is necessary for two purposes. One is to reduce the formation of chemical by-products from the microscopic arcing occurring at the moment of connection and disconnection as a result of local vaporization of small amounts of mercury and the contact surfaces. In the presence of reactive gasses such as oxygen in the air, the oxides formed probably would eventually cause failure of the electrical connections during the switched on condition of the relay. In addition, hermetic sealing reduces the possibility or releasing the element mercury to the environment. An additional function of the hermetic seal is to contain a gas such as Argon or Krypton due to the inert nature of these gasses. However, practical experience has demonstrated that Hydrogen in mercury switches is also a good option but is more difficult to contain. Again, selection of the particular gas is dependent on the intended application of variants of the invention. In any case, a hermetic seal is necessary to allow use of some type of gas to displace oxygen, or support a vacuum, which also has certain other potential benefits, for example greater resistance to contact arcing. The example relay utilizes Argon gas at a static pressure of 2 bar.

A sequence of steps from the disconnected state of the invention to the connected state are described in FIGS. 4 through FIG. 8. The connection sequence is essentially reversed for the disconnect sequence, variations will be discussed as necessary.

To aid in understanding the details of how the mercury liquid is used in the example relay, the following description is provided.

When the example relay is at rest in the open position, the piezoelectric disk bender(s) is disposed such that the contents of the mercury reservoir are expelled into the contact gap(s), even though the piston is retracted. This is done to aid in the long-term retention of mercury, as having mercury in the contact gap(s) tends to help any residual mercury in this area rejoin the liquid mass, which aids in long term function of the relay.

When the example relay is directed to close, the piezoelectric disks are controlled to initially move the mercury from the contact gap areas back into the reservoir and then at a chosen time in the relay closure operation, move it back into the contact gap(s). This is done in conjunction with how the AC cycle is moving towards a "zero voltage crossing" to control the location of the mercury in relation to the voltage potential across the contacts and is discussed in more detail below.

Figure 4:
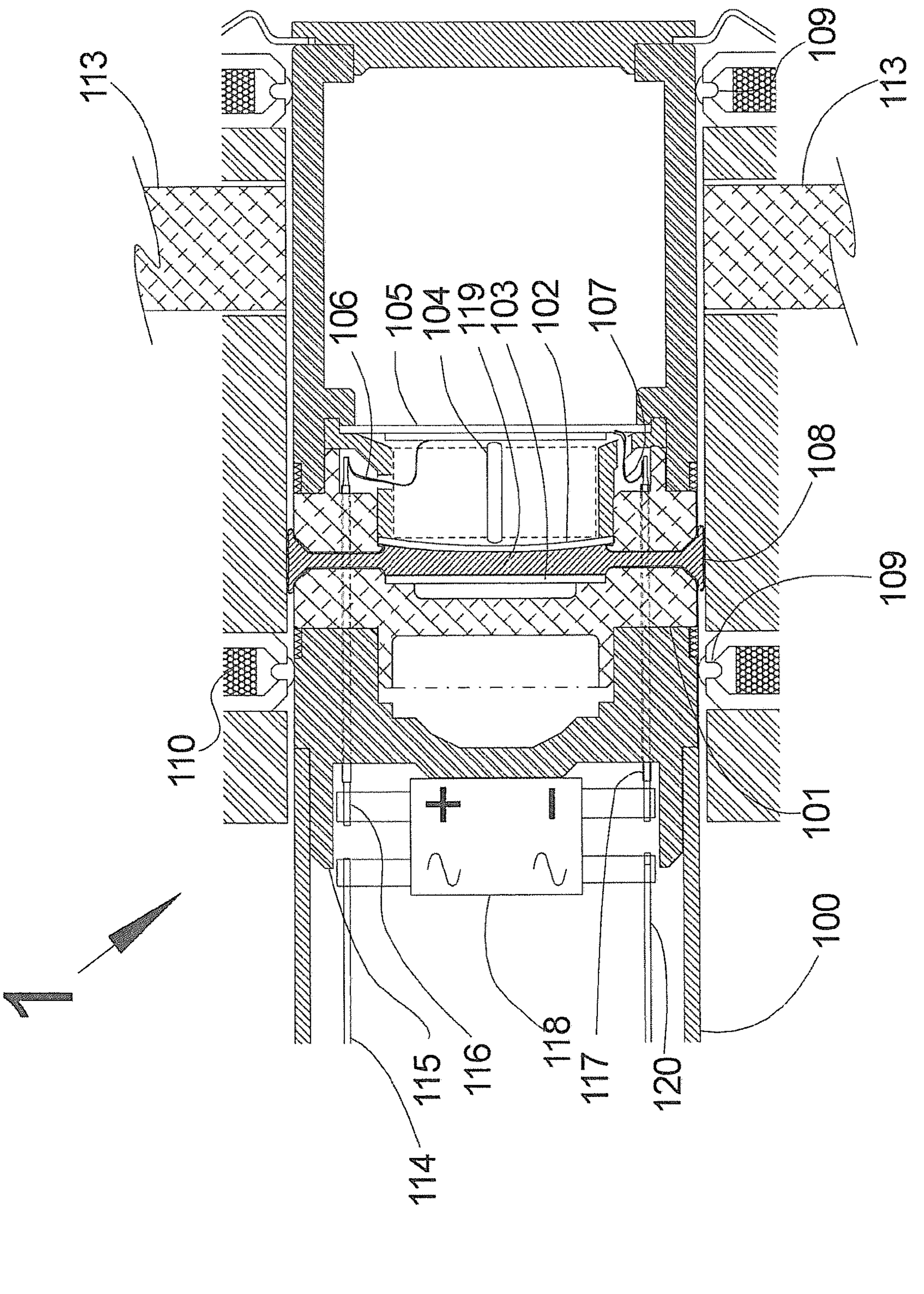
FIG. 4 shows the relevant components of the example relay at rest in the electrically disconnected, or Open State (OS).

Referencing FIG. 4, additional components of the piston and surrounding bore are shown. This view is representative of the switch (1) element of the example relay, with the electromotive action of moving the piston being assumed from previous discussion of the motor.

Wires (114, 120) deliver current being applied to the motor to a bridge rectifier (118). The purpose of the bridge rectifier is to deliver a DC voltage to the Piezo disc bender (105) via link wires (116, 117) in the same polarity, regardless of the direction of applied voltage to the coil previously discussed in the motor description. Thus, regardless of the direction of actuation of the piston assembly, either traveling towards making switching contact, or retreating to disconnect the switch, the piezoelectric disc bender will actuate such that it moves mercury into the reservoir by extracting the mercury from the contact gaps via the tips of the ports on both ends of the reservoir. An insulating material such as polyethylene is used as a support base (115) of the various components of the piston and switch assembly. The mercury reservoir is constrained on the back and front faces of the mercury by elastomeric discs (102, 103) such that forces acting upon those discs can effect bending of the discs, thus changing the overall volume of the reservoir. It should be noted that the depiction is exaggerated, and the volumes of the reservoir, and diameter of the port(s) is exaggerated to help describe the operation. The mercury (119) is shown being compressed such that it is slightly filling the gap between the link (101) and the bore of the insulated outer housing at point (108). The compression is due to the lack of any current in the drive motor, the switch is at rest, a stable state, or the Open State, OS. The alternative state is the Closed State, or CS. This example relay is of a class referred to as a latching relay, e.g., once switched, it stays in that state until further action is taken to change the state. The mercury reservoir is compressed by the fact that the piezo disc bender is not being electrically driven at this time and thus it is in the flattened position. This results in pressure being applied to push rod (104), pressing on the elastomeric disc, (102) henceforth called the front diaphragm, deflecting it and compressing the mercury reservoir. The push rod is necessary to maintain an acceptable spacing between the primary electrical switched components, and the piezoelectric element, which is electrically part of the drive circuit. This is commonly referred to in the industry as "coil" or "body" isolation. Seals (109) are concentrically configured around the piston to prevent trace amounts of vaporized, or particulated mercury from escaping. The axial motion of the piston will tend to re-collect the condensed mercury and replenish the supply resolving one of the problems mentioned earlier with mercury wetted relay construction of previous designs. The bobbin (100) of the motor is shown connected to the support base (115) by a friction interference fit, but other means of bonding are possible.

Figure 5:
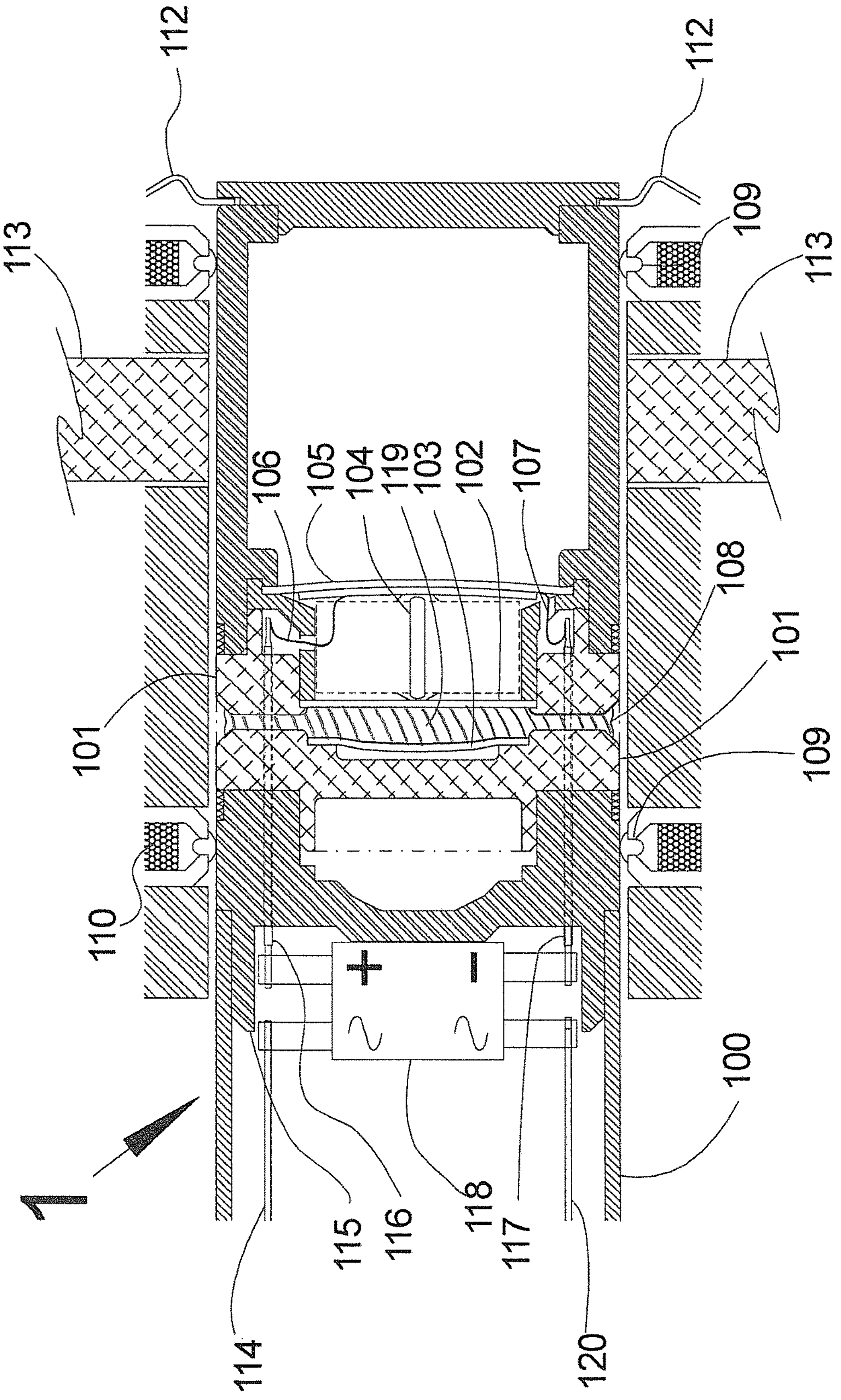
FIG. 5 shows the relevant components of the example relay at the initiation of changing state from open to closed.

FIG. 5 depicts a time very shortly after the initiation of the connect switch cycle. At this point, the electronic driver has predicted the time of the crossing of the AC cycle through zero, and has initiated the mechanical motion prior to that event. Since the mass and characteristics of the motor and the piston are reasonably predictable, the estimation of the arrival of the link (101) entering the primary contact bore (113) can be made with a fairly high degree of accuracy. Upon initial application of current to the motor coil, the piston begins to accelerate from left to right. Simultaneously, the motor current is also delivered through the bridge diode (118) to the piezo disc bender (105) causing it to bend outward relative to the mercury reservoir. This happens very rapidly, on the order of less than 500 micro-seconds, as the disc bender and mercury reservoir are both of low mass. In the example relay, a total of approximately 15 milligrams of mercury are displaced. As a result the surface of the mercury (108) retreats into the tips of the ports as the piston starts to move towards the primary switched contacts (113). In addition, as the acceleration of the piston occurs, the diaphragm at the back of the reservoir is slightly deflected from the inertia of the mercury (119) in the reservoir. At this stage of the sequence, this assists in the extraction of the mercury and pulling contact mercury back into the ports. A sufficient volume of mercury has already been moved into the ports from the effect of the piezo disc bender (105) at the onset of the start of the cycle. But the additional movement of mercury is beneficial from the standpoint of preparing for the end of the cycle. It should be noted the geometry and number of the ports has a significant influence on the velocity of change and stability of the surface tension in the contacting volume of mercury (or conductive liquid) between the link and the bore. The ports, reservoir and related geometric profiles shown in the example relay are presented for clarity of principal, and may not exactly reflect the finalized details of an actual operational relay.

Figure 6:
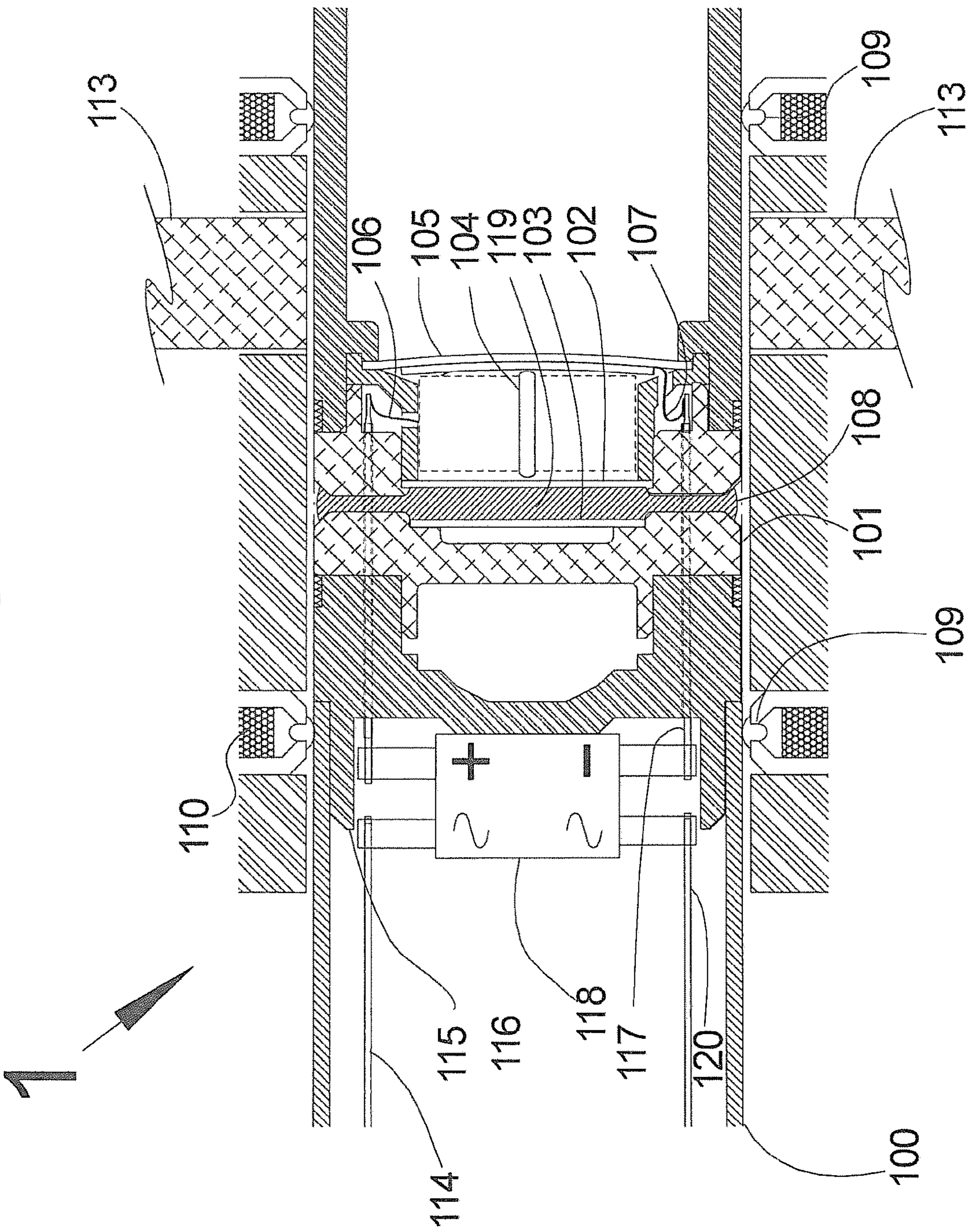
FIG. 6 shows the relevant components of the example relay at the midpoint of changing state from open to closed.

FIG. 6 shows the piston in mid cycle. Conditions are essentially the same as the acceleration step, but the velocity of the piston is at the maximum, and the back diaphragm is now flattened out, thus pushing some of the mercury in the reservoir towards the ports. This action is not instantaneous, but rather a protracted change of direction and velocities of molecular flow (fluid properties) of the mercury, or similar conductive liquid. These operations are happening in the tens of microseconds timeframe, and due to the inertia of the mercury, the acceleration and de-acceleration of the flows is spread out over a great percentage of the stroke of the piston. Suffice it to say, at the mid point, when the current to the coil is reversed to start the de-acceleration phase of the piston, the piezo disc bender (105) remains bent due to the rectifier (118) action, and the volume in the reservoir remains effectively unchanged.

Figure 7:
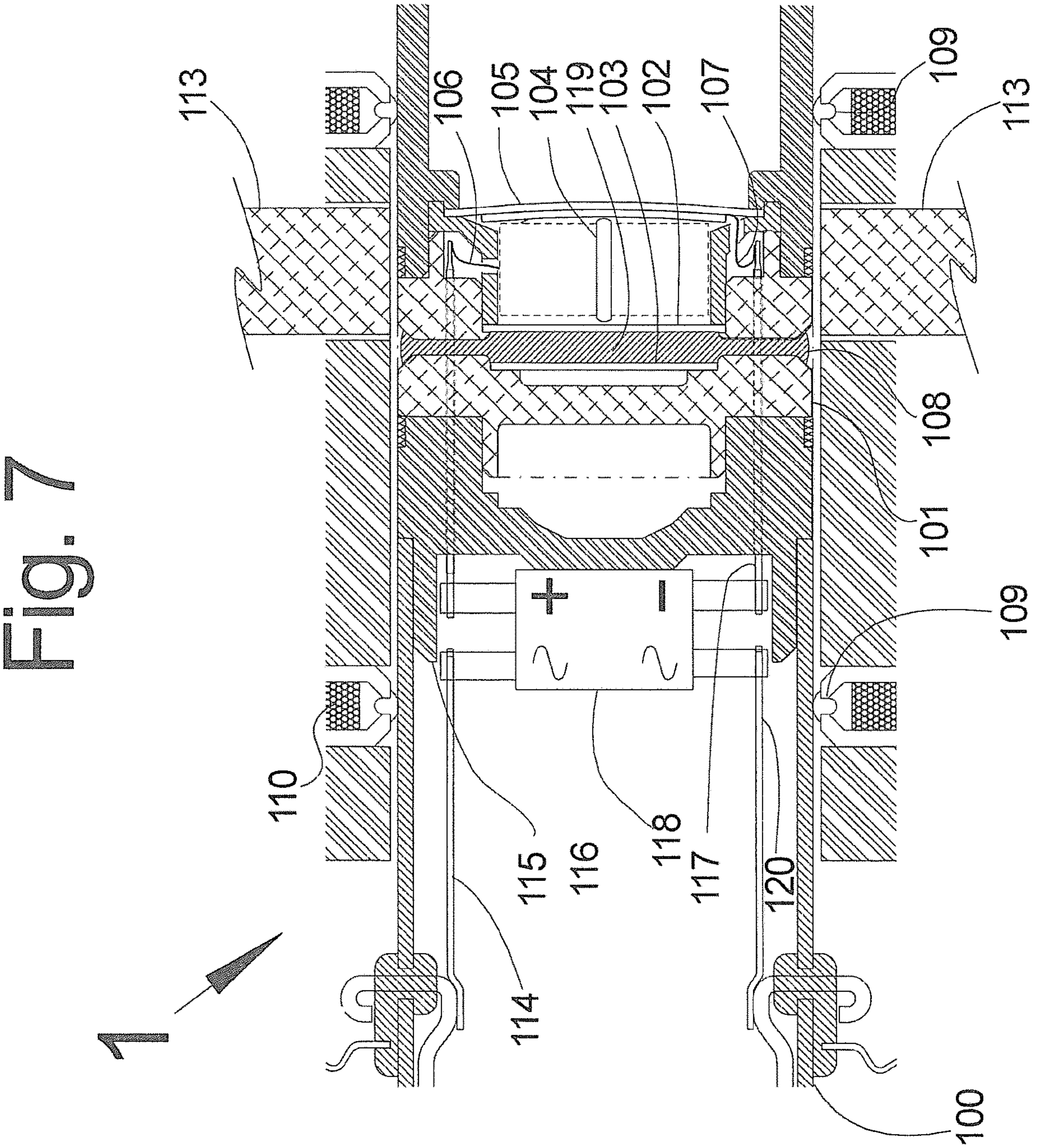
FIG. 7 shows the relevant components of the example relay nearing completion of changing state from open to closed.

FIG. 7 shows the piston nearing the end of the de-acceleration phase. The link (101) has entered the gap in the primary contact bore (113), but electrical contact has not yet been made. The AC cycle of applied voltage between the terminals of the primary contact bore is now approaching zero, but still is not there. But the voltage is now low enough that arcing between the contacts is not possible due to the gap between the bore and the link.

Figure 8:
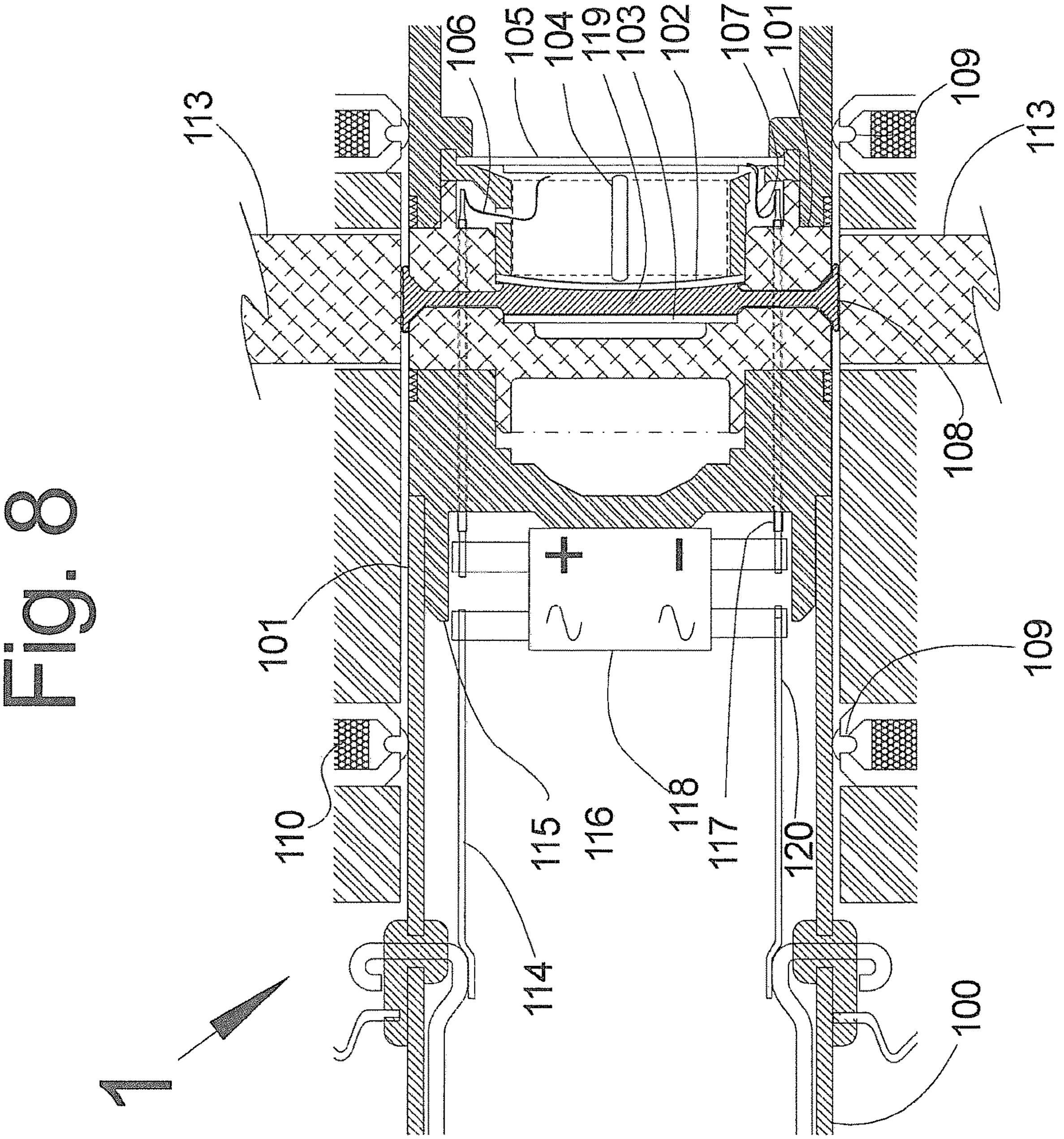
FIG. 8 shows the relevant components of the example relay at the completion of changing state from open to closed.

FIG. 8 shows the completion of the switch closure operation. The piston has fully inserted the link (101) between the primary contact bore (113), the AC cycle has just reached the zero voltage point, and the current to the motor coil has been removed. At this moment, (slightly before in practice) the piezo disc bender (105) has flattened back out due to the loss of current in it. It pushes on the push rod (104), which in turn presses on the front diaphragm (102) displacing the last volume of mercury from the reservoir necessary to close the gap between the link and the primary switch contacts (113), thus completing the electrical circuit. The back diaphragm (103) absorbs the shock wave formed in the mercury reservoir (119) from the nearly instantaneous pressure rise when the piezo disc bender (105) loses current, Selection of the elastomeric properties of the back diaphragm is dependent on numerous variables, but ultimately has been selected to allow a smooth transition of mercury into the gap (108) with little over-shoot. This is damping and will improve the tendency of the mercury to remain a monolithic volume of liquid, thus maintaining the cohesive integrity of the perimeter of the contacting volume of mercury (or conductive liquid) between the link and the bore.

The disconnection phase can now be clearly envisioned, as it is essentially the reverse sequence. The electronic source can predict when the mercury will retract from the face of the primary contact bore (113) with a high degree of accuracy, and hence make the physical electrical disconnection very nearly at the zero crossing, just as the piston motion begins to accelerate. The gap formed will suffice to open the electrical switch for the time necessary for the piston to remove the link (101) from the bore. As the AC voltage rises, the gap between the link (101) and the primary contact bore (113) increases at a rate grater than the ever increasing voltage breakdown threshold. It stays "ahead" of the breakdown threshold. This acceleration phase must happen within about 3 milliseconds to prevent the breakdown threshold from being exceeded. Thus the use of lightweight materials, small overall size of the link, low volume of mercury and reasonably high electromotive force from the motor.

It should be noted that the motor, being of a permanent magnet variety, can return energy from the acceleration phase back to the power supply during the de-acceleration phase. Since there is no significant friction between components, (minimal loss) much of the energy can be conserved, further reducing the power requirements of the switch operation as a whole.

Figure 9A:
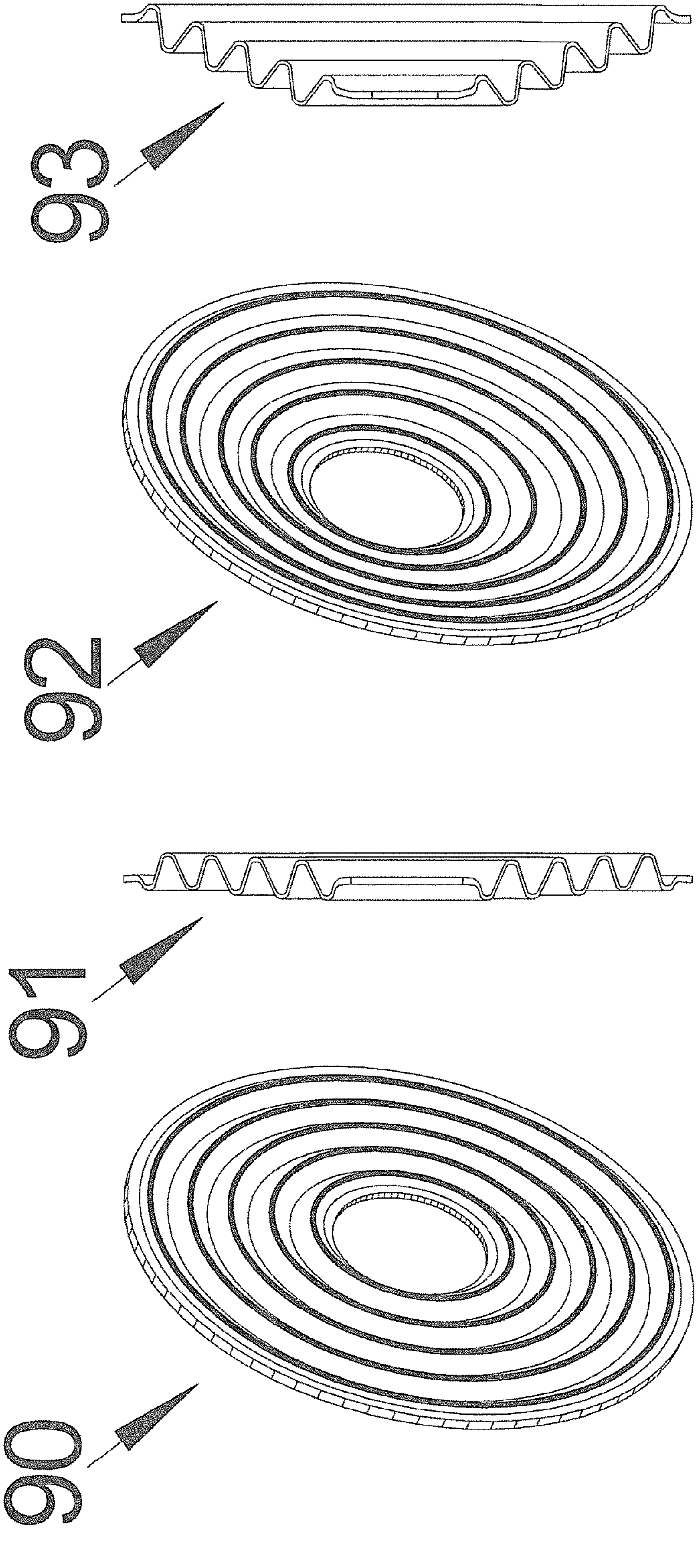
FIG. 9*a* shows the orthogonal and cross section views of a typical loudspeaker type spider and the variation utilized in the example relay.
Figure 9B:
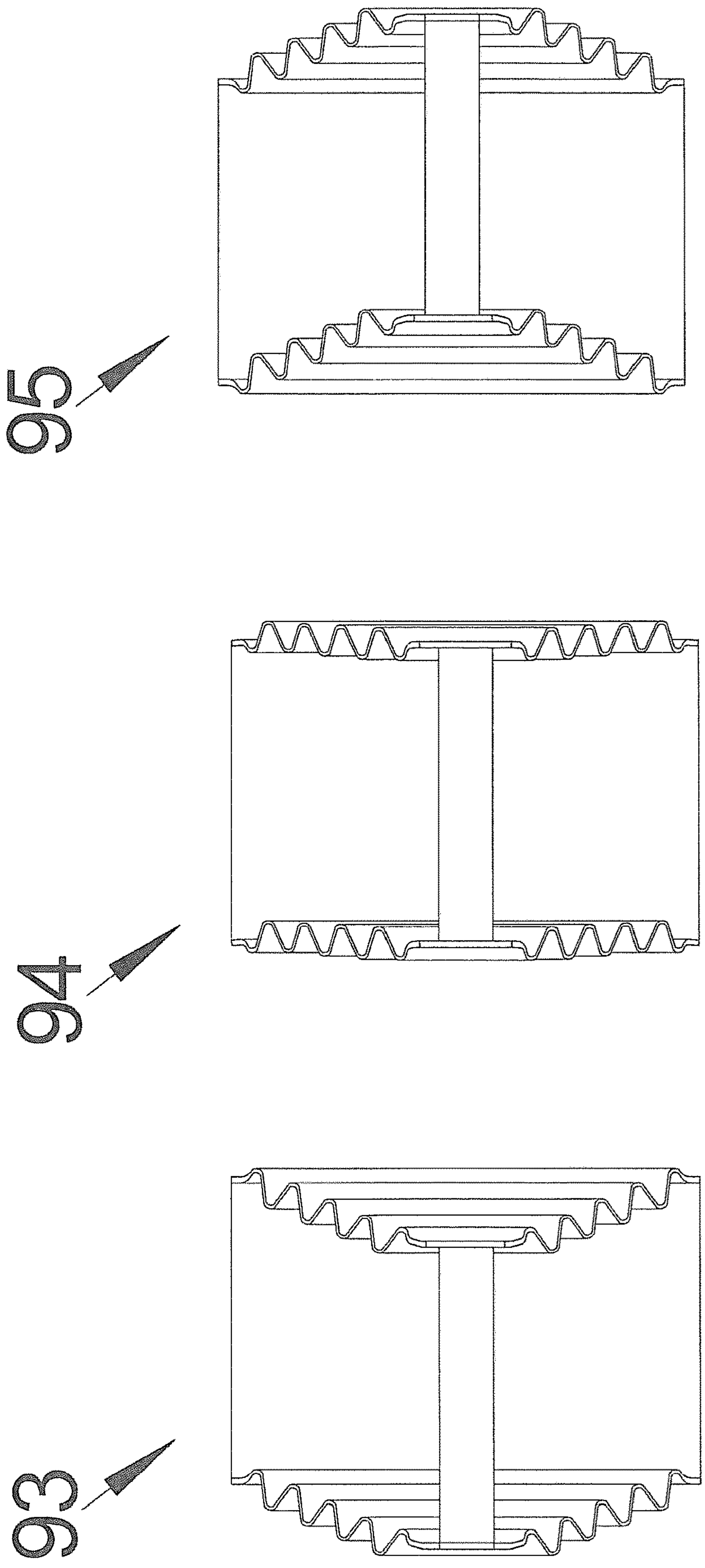
FIG. 9*b* shows the cross section views demonstrating the condition of the spiders utilized in the example relay in three states i) in of the parked OS, ii) in the mid-transfer state and iii) in the parked Closed State (CS).

Because the example relay is of a bistable configuration, as mentioned earlier the equivalent of a latching relay, a means of holding the piston at either end of the stroke is necessary. This is done by an artifact of the use of the spider piston concentric supports. Observing FIG. 9*a*, the Orthogonal and cross section view of a typical speaker type spider is shown (90, 91). In the application of this example relay, the natural state of the formed spider is more of a concentric pleated cone. The degree of the pleating and cone depth are determined by the stroke and inertial placement holding characteristics needed to hold the switch in either closed or open positions for the intended application. For example, if the switch is used in a stationary application the tendency to hold the relative position of the piston is not as great as the requirement to hold it in a high vibration environment. In any case, adjustment of the holding force is determined by the stiffness, number, and depth of the pleats in the pair of spiders. From the view presented in FIG. 9*b*. It can be observed that when the cones described in 9*a* are connected together, such as on the piston, they will remain stable in the position shown in 93. If a force is applied, the cones will move relative to each other, but provide some resistance due to the shortening of the distance from pleat to pleat. Upon exiting the travel from left to right midpoint 84, the pleats now tend to try to expand to the natural shape and the core will continue the acceleration and ultimately come to rest finding a point of equilibrium at the opposite end of the stroke as shown in 95. The electronic circuits associated with driving the motor will counteract the acceleration at the end of the stroke, just before the closure of the switch is made, and thus can control smoothly the acceleration and de-acceleration. But the natural tendency of the spider cones to find equilibrium at each end of the stroke is put to advantage in establishing a bistable, or “latching” relay configuration. It should be noted that other stable points could be chosen for the equilibrium point(s), if desired.

Figure 10:
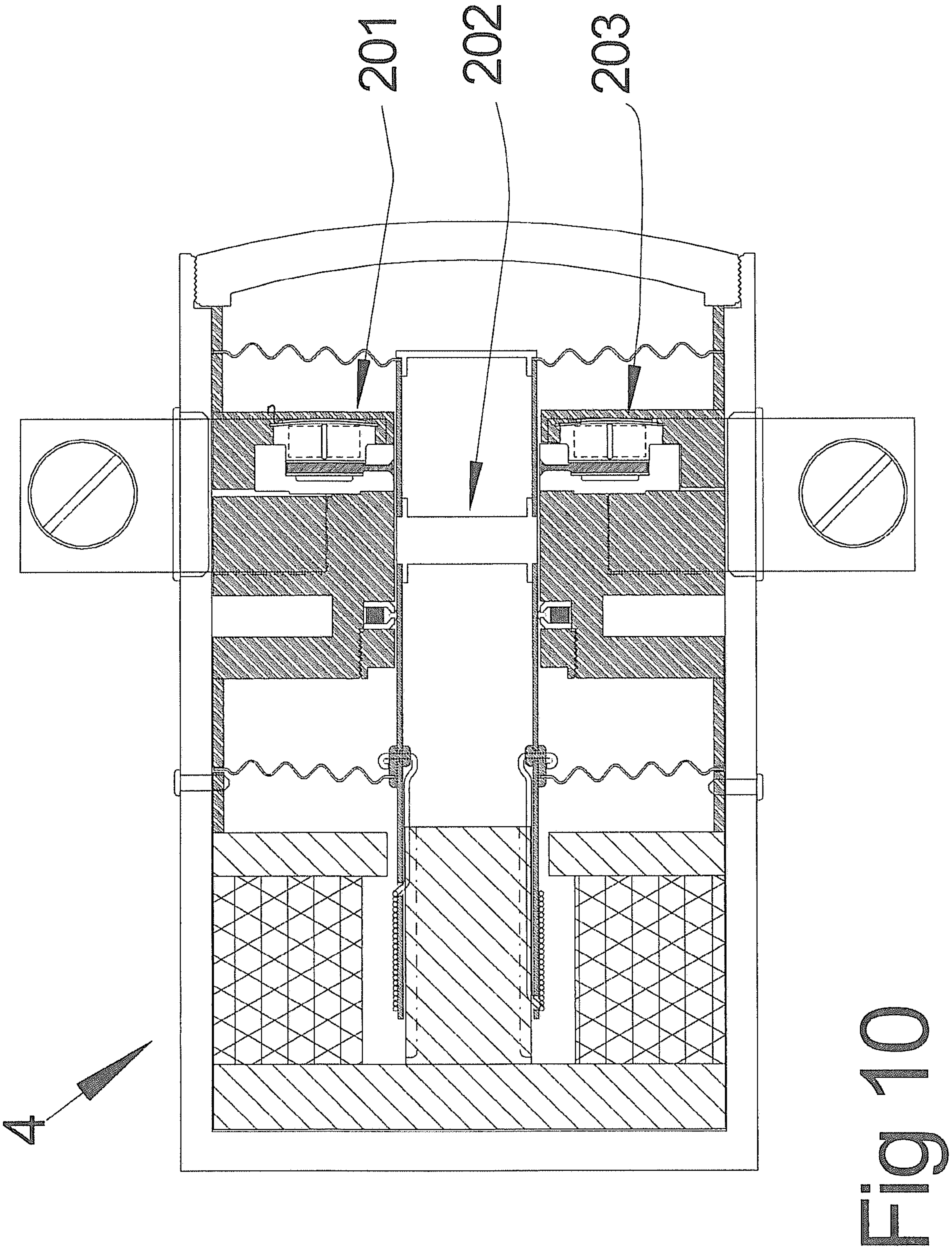
FIG. 10 shows an alternate construction of a relay in accordance with the invention.

FIG. 10 depicts an alternate instantiation in accordance with the invention. Example relay (4) is of similar construction as the preferred instantiation of the invention discussed earlier, with the notable exception of a significantly lowered moving mass, which can be beneficial in to certain functional characteristics such as transfer time and may allow cost reductions. This is accomplished by moving the mercury reservoir, ports and piezoelectric components into a pair of such on the stationary primary switch contacts (201,203) as shown, and a utilizing a straight through conductor (202) affixed to the piston. Electrical drive to the piezoelectric components is similar to the preferred instantiation described earlier with the notable difference that the rectifier bridge diode assembly is moved from the piston to a non-moving mass location, possibly external to the relay assembly.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed:

1. An electrical switch, comprising:

a first electrode and a second electrode, wherein an electrical circuit is closed when said first and second electrodes are in electrical contact and said circuit is opened when said first and second electrodes are electrically disconnected;

a primary switch mechanism for moving at least one of said first and second electrodes between first and second positions, wherein, in said first position, said first and second electrodes are separated by a first distance and, in said second position, said first and second electrodes are separated by a second distance that is less than at first distance but greater than zero;

a secondary switch mechanism, operative independent of said first switch mechanism, for establishing an electrical connection between said first and second electrodes when said first and second electrodes are in said second position; and a control system for controlling operation of at least one of said first and second switch mechanisms such that one of a connection between said first and second electrodes and a disconnection between said first and second electrodes is synchronized with a phase of said power signal.

2. The electrical switch of claim 1, wherein said first electrode is mounted on a piston for reciprocal motion within a piston housing, said switch further comprising a motor for driving said reciprocal motion of said piston within said piston housing.

3. The electrical switch as set forth in claim 2, wherein said piston housing comprises a cylinder.

4. The electrical switch as set forth in claim 2, wherein said motor comprises a magnet connected to said piston housing and a coil connected to said piston, wherein an electrical signal applied to said coil causes motion of said piston with respect to said piston housing due to interaction of said coil and magnet.

5. The electrical switch as set forth in claim 4, wherein said second electrode is mounted on said piston housing.

6. The electrical switch as set forth claim 4, wherein said electrical signal applied to said coil is coordinated with a power signal of said circuit such that operation of the electrical switch is synchronized with said power signal.

7. The electrical switch as set forth in claim 6, wherein said one of said connection between said first and second electrodes and said disconnection between said first and second electrodes is synchronized with a zero crossing of said power signal.

8. The electrical switch as set forth in claim 1, wherein said secondary switch mechanism comprises a conductive fluid system for forcing a conductive fluid into a space between said first and second electrodes to establish said electrical connection and for withdrawing said conductive fluid from said space between said first and second electrodes to break said electrical connection.

9. The electrical switch as set forth in claim 8, wherein said secondary switch mechanism comprises a reservoir of said conductive fluid and a movable diaphragm for moving said conductive fluid into and out of said reservoir.

10. A method for operating an electrical switch, comprising:

providing an electrical switch including a first electrode and a second electrode, wherein an electrical circuit is closed when said first and second electrodes are in electrical contact and said circuit is opened when said first and second electrodes are electrically disconnected;

first operating a primary switch mechanism for moving at least one of said first and second electrodes between first and second positions, wherein, in said first position, said first and second electrodes are separated by a first distance and, in said second position, said first and second electrodes are separated by a second distance that is less than at first distance but greater than zero;

second operating a secondary switch mechanism, independent of said first switch mechanism, for establishing an electrical connection between said first and second electrodes when said first and second electrodes are in said second position; and third operating a control system for controlling operation of at least one of said first and second switch mechanisms such that one of a connection between said first and second electrodes and a disconnection between said first and second electrodes is synchronized with a phase of said power signal.

11. The method of claim 10, wherein said first electrode is mounted on a piston for reciprocal motion within a piston housing, said method further comprising operating a motor for driving said reciprocal motion of said piston within said piston housing.

12. The method as set forth in claim 11, wherein said motor comprises a magnet connected to said piston housing and a coil connected to said piston, and said first operating comprises applying an electrical signal to said coil to cause motion of said piston with respect to said piston housing due to interaction of said coil and magnet.

13. The method as set forth claim 12, wherein said first operating comprises applying said electrical signal to said coil in coordination with a power signal of said circuit such that operation of the electrical switch is synchronized with said power signal.

14. The method as set forth in claim 10, wherein said one of said connection between said first and second electrodes and said disconnection between said first and second electrodes is synchronized with a zero crossing of said power signal.

15. The method as set forth in claim 10, wherein said second operating comprises forcing a conductive fluid into a space between said first and second electrodes to establish said electrical connection and for withdrawing said conductive fluid from said space between said first and second electrodes to break said electrical connection.

16. The method as set forth in claim 15, wherein said secondary switch mechanism comprises a reservoir of said conductive fluid and a movable diaphragm, and said second operating comprises moving said conductive fluid into and out of said reservoir.

* * * * *